United States Patent [19]

Cantrell

[11] Patent Number: 4,784,555
[45] Date of Patent: Nov. 15, 1988

[54] PROTECTIVE AND ORNAMENTAL COVER FOR NUTS AND BOLTS

[76] Inventor: Roger M. Cantrell, Rte. 4, Cedartown, Ga. 30125

[21] Appl. No.: 25,005

[22] Filed: Mar. 12, 1987

Related U.S. Application Data

[63] Continuation of Ser. No. 773,648, Sep. 9, 1985, abandoned.

[51] Int. Cl.$^4$ .................................. F16B 37/14
[52] U.S. Cl. .................................. 411/431; 411/373; 411/910; 403/372
[58] Field of Search .................. 411/371–373, 411/427, 429, 431–433, 517, 352, 353, 910, 409; 403/372; 220/378, 85 P; 138/89.4, 96 R; 285/901

[56] References Cited

U.S. PATENT DOCUMENTS 1,046,973 12/1912 Christie .
1,162,099 11/1915 Patton .................................. 138/89.4
2,095,289 10/1934 Rosenberg ...................... 411/431 X
2,729,126 1/1956 Stanton .......................... 411/353 X
3,101,984 8/1963 Wieckmann .......................... 285/918
3,305,120 2/1967 Owen .................................. 138/96 R
3,548,704 12/1970 Kutryk .
4,444,301 4/1984 Granberry ...................... 411/427 X

FOREIGN PATENT DOCUMENTS 559861   3/1975 Switzerland ........................ 411/371
 15153 of 1896 United Kingdom ................ 411/373
832019   4/1960 United Kingdom ................ 411/371
2090361  7/1982 United Kingdom ................ 411/910

Primary Examiner—Neill R. Wilson
Attorney, Agent, or Firm—Hurt, Richardson, Garner, Todd & Cadenhead

[57] ABSTRACT

A nut, threaded onto the end portion of a bolt receives a cup shaped cover having an internal radial groove receiving an O-ring therein. The O-ring frictionally holds the cover on the nut. The nut is octagonal, hexagonal or square.

6 Claims, 1 Drawing Sheet

U.S. Patent  Nov. 15, 1988  4,784,555
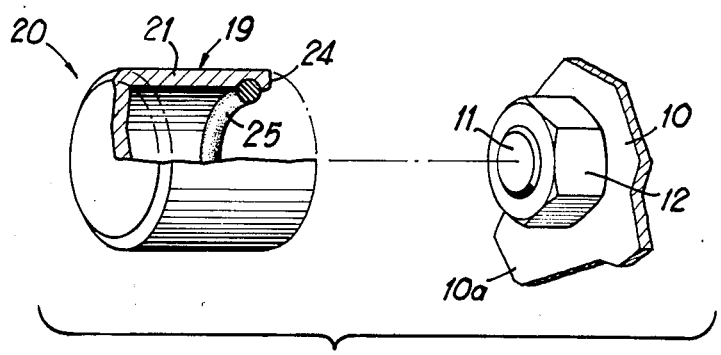
FIG 1
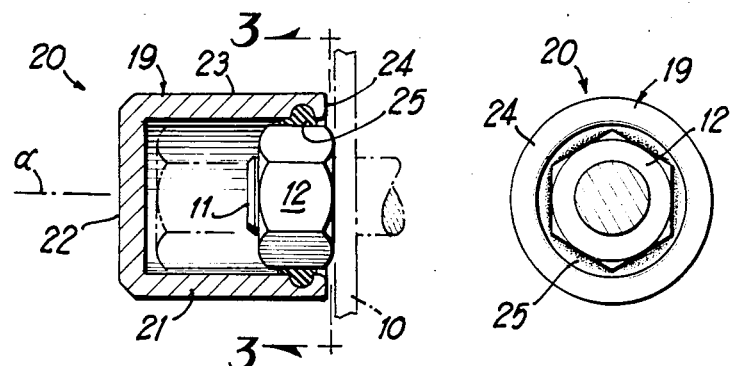
FIG 2    FIG 3
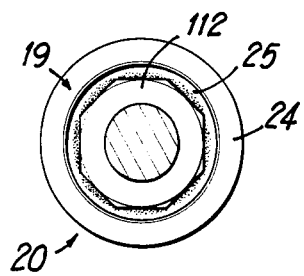   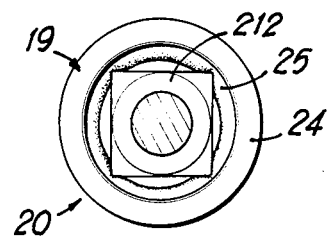
FIG 4    FIG 5

PROTECTIVE AND ORNAMENTAL COVER FOR NUTS AND BOLTS

This is a continuation of co-pending application Ser. No. 773,648 filed on Sept. 9, 1985, now abandoned.

BRIEF SUMMARY OF THE INVENTION

This invention relates to a cover, nut and bolt assembly and is more particularly concerned with a protective and ornamental cover for nuts and bolts.

In the past, protective caps or covers have been devised. U.S. Pat. No. 1,046,973 discloses one such cover or cap. In that patent, the nut is provided with a helical or spiral groove which receives a coil within the groove, the coil sliding into a recess at a corner portion of the nut when received on the nut. U.S. Pat. No. 3,548,702 reveals still another type of protective cap, this cap being formed of plastic and having a projection within the cap provided with ribs which engage the external threads of the bolt for maintaining the cap on the nut. Still another type of cap is revealed in U.S. Pat. No. 2,095,289 wherein the externally threaded end portion of the bolt is covered by a semispherical cap having either prongs or a clip which engages the external threads of the bolt outwardly of the nut. Each of these devices is a complicated member which must be screwed onto the protruding end of the bolt or must have a specially prepared nut for receiving the cap.

The present invention provides a cup-shaped cap or cover having a cylindrical body closed at one end. The other end of the cylindrical body is open and the inner periphery of this cylindrical body is provided with an annular groove disposed immediately adjacent to the open end of the body. The groove receives, therein, an O-ring which is sufficiently resilient that, when the cap or cover is when inserted on a hexagonal, octagonal, or square nut, the O-ring will retain the cover in place. Such protective covers are particularly useful for covering the bolts and nuts on an automobile and specifically on an automobile engine and on the automobile wheel.

Accordingly, it is an object of the present invention to provide a cover for nuts and bolts which cover is inexpensive to manufacture, durable in structure and efficient in operation.

Another object of the present invention is to provide a nut and bolt cover assembly wherein the cover essentially encloses both the nut and the end portion of the bolt and is frictionally held in place so that it may be readily removed and yet firmly held until removed.

Another object of the present invention is to provide a nut and bolt cover which will give an improved appearance to the protruding end portion of a nut and bolt.

Other objects, features and advantages of the present invention will become apparent from the following description when taken in conjunction with the accompanying drawings wherein like characters of reference designate corresponding parts throughout the several views.

DESCRIPTION OF THE DRAWING

FIG. 1 is an exploded fragmentary perspective view of the cap nut and bolt assembly constructed in accordance with the present invention;

FIG. 2 is a vertical sectional view of the cap nut and bolt assembly shown in FIG. 1;

FIG. 3 is a vertical sectional view taken substantially along line 3—3 in FIG. 2;

FIG. 4 is a view similar to FIG. 3 but showing a modified form of the invention in which an octagonal nut is substituted for the hexagonal nut shown in FIG. 3; and FIG. 5 is a view similar to FIGS. 3 and 4 but showing another modified form of the invention in which a square nut in place of the hexagonal and octagonal nuts shown respectively in FIGS. 3 and 4.

DETAILED DESCRIPTION

Referring now in detail to the embodiments chosen for the purpose of illustrating the present invention, it being understood that in its broader aspects, the present invention is not limited to the exact details herein depicted, numeral 10 denotes generally a flat plate, such as a sheet metal part of an automobile through which a bolt 11 projects. Plate 10 has a flat outer surface 10a. As is usual, the bolt 11 has an externally threaded end portion on which is threadedly received a conventional symmetrical hexagonal nut 12. The nut 12 has conventional internal threads which mate with the external threads on the end portion of the bolt 11. The structure thus far described is conventional.

A protective and ornamental cover or cap assembly denoted generally by the numeral 20, extends over the nut 12 and abuts the flat outer surface 10a of the plate 10. This cap assembly 20 includes a cap 19 having a hollow tubular cylindrical body 21 which has an inside diameter slightly larger than the maximum diameter of the nut 12, as seen best in FIG. 2. The outer end of the hollow cylindrical body 21 is closed by a flat radially extending end plate 22. This cap or cover 19 can either be drawn or cast of metal or plastic and, indeed, the cap or cover 19 can be injection molded, if desired.

It is preferable to provide, along the peripheral surface of the body 21 and the outer surface of the end plate 22, a shiny reflective plating, formed of chromium or zinc. The body 21 has an axis of which is concentric with the axis of shaft or bolt 11, when the cap is installed, as illustrated in FIG. 2.

The inner end of the body 21 has a flat radial surface 24 which when the cap or cover assembly 20 is installed, abuts the outer surface 10a of plate 10, as shown in FIG. 2.

According to the present invention, I have provided a continuous circumferential groove 26 along the inner peripheral surface of the cylindrical body 21, the groove 26 being inwardly adjacent to the flat annular surface 24. In cross section, the groove 26 is semi circular and open, toward axis a.

This concave groove 26 receives an appropriate size elastomeric member such as resilient O-ring 25 therein, the diameter of the O-ring 25 being such that the O-ring 25 will remain in place in the groove 26 unless forcefully removed. The diameter of the annulus of the O-ring 25 is sufficiently large that the inside diameter of the O-ring 25 (when the O-ring 25 is not deformed) is less than the maximum diameter of nut 12.

The distance from the O-ring 25 to the surface 24 is preferably equal to a less than half the thickness of the nut 12 so that the O-ring 25 will fit an appreciable distance over the end of the nut 12 when the cover or cap 19 is installed as illustrated in FIG. 2. When the cup 19 is inserted onto the nut 12, the O-ring 25 is deformed outwardly by all of the points of nut 12. Hence, the cap 19 is resiliently and yieldably held in place on nut 12.

In FIG. 4 it is seen that the same cup assembly 20 can be received on an Octagonal nut 112. As shown in FIG. 5, the same cup of cover assembly 20 can be received on a square nut 212. When installed on the nut 12 or 112 or 212, the sharp edges of the nut dig into the inner peripherial surface of the O-ring 25 so as to prevent rotation of the cap assembly 20 with respect to the nut 12, 112 or 212. The O-ring 25, however, will be sufficiently deformed that it holds the cap assembly 20 quite firmly on the nut 12, 112, or 212.

It will be obvious to those skilled in the art that many variations may be made in the embodiments chosen for the purpose of illustrative the best mode of making and using the present invention, without departing from the scope thereof as defined by the appended claims.

I claim:

1. A cover nut and bolt assembly comprising:
   (a) a work piece having a generally flat surface;
   (b) an externally threaded bolt having an end portion protruding outwardly along an axis from said flat surface;
   (c) a symmetrical nut threadedly received on said end portion of said bolt, said nut having circumferentially a plurality of equally spaced flat side surfaces and equally spaced straight and continuous points forming common edges of the side surfaces of said nut at the maximum diameter of said nut, said points extending axially throughout substantially the entire length of said sides, said sides being flat throughout substantially their entire lengths;
   (d) A cover or cap having a hollow tubular body, the interior of which has an inside dimension slightly larger than the maximum diameter of said nut, the cap or cover having an end portion which surrounds said nut when said cover or cap is placed over said nut and said end portion of said bolt, and a plate completely closing the other end portion of said body; the interior of said body being essentially unobstructed between the end of the bolt and the plate and being of a length greater than the length of either said end portion of said bolt or said nut, said body at said one end portion of said body having an end surface for abutting said flat surface when said cap or cover is inserted over said nut;
   (e) said body being provided with a radially disposed continuous groove along said inside surface; and
   (f) an elastomeric member received in said groove for frictionally firmly engaging said points of said nut when said cover or cap is inserted over said nut and said end portion of said bolt for providing essentially the sole means for securing said cap or cover in place on said nut.

2. The cover assembly defined in claim 1 wherein said body is cylindrical, and said elastomeric member is an O-ring which is deformable by the points of said nut.

3. The cover assembly defined in claim 2 wherein said one end portion of said body has a flat radially extending bottom surface.

4. The cover assembly defined in claim 2 wherein said nut is hexagonal.

5. The cover assembly defined in claim 2 wherein said nut is octagonal.

6. The cover defined in claim 2 wherein said nut is square.

* * * * *